July 12, 1927.
D. McWILLIAM
1,635,630
SIGNAL DEVICE FOR MOTOR CARS AND THE LIKE
Filed April 24, 1925
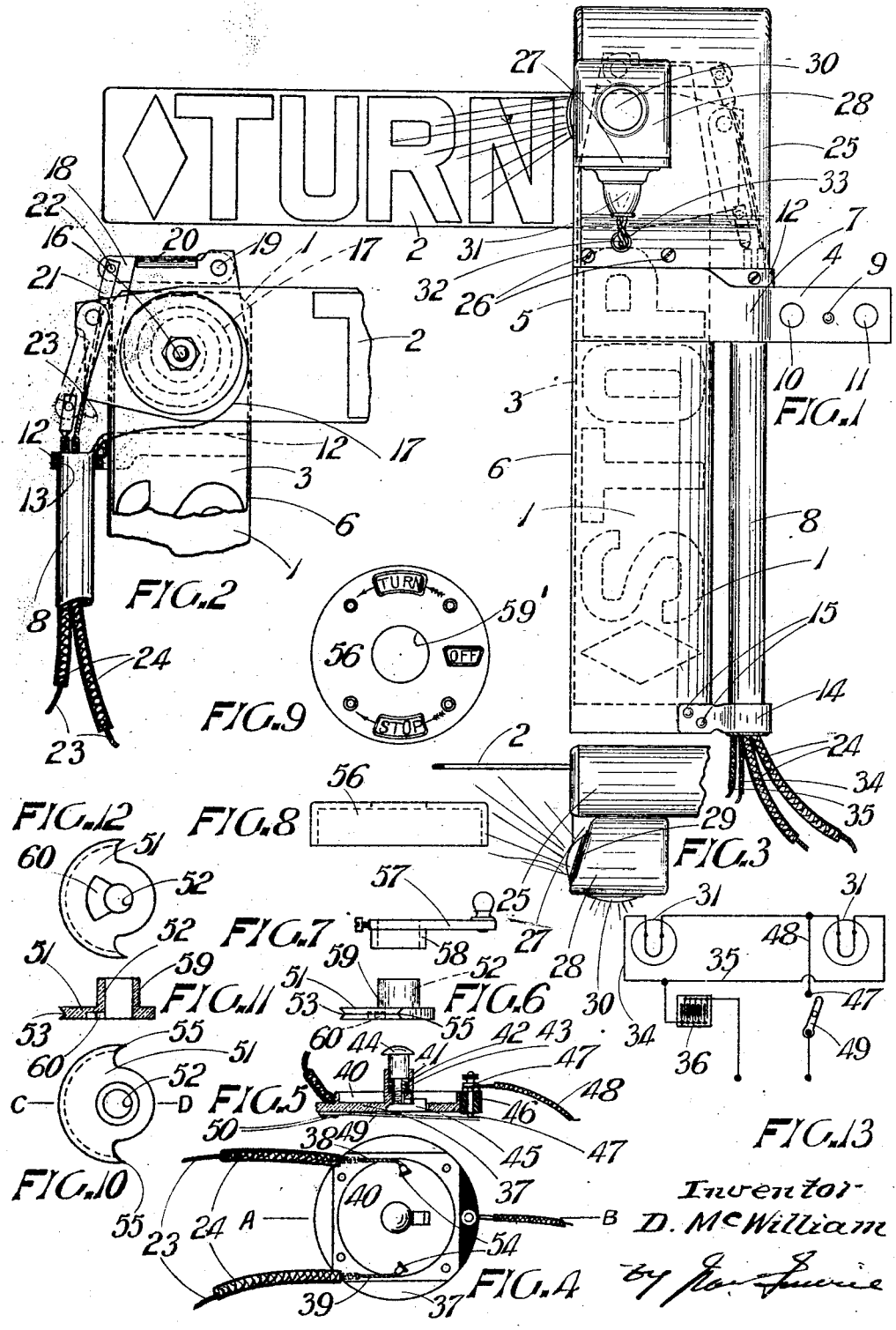
Inventor
D. McWilliam Patented July 12, 1927.

1,635,630

UNITED STATES PATENT OFFICE.

DOUGLAS McWILLIAM, OF DUNEDIN OTAGO, NEW ZEALAND.

SIGNAL DEVICE FOR MOTOR CARS AND THE LIKE.

Application filed April 24, 1925. Serial No. 25,656.

This invention relates to devices which indicate to the general traffic the immediate intention of the driver of the vehicle to stop or turn.

In order to warn other vehicular traffic following or approaching, and to give some indication of the driver's intention to turn, it has become a universal rule, and in some countries a law, for a driver of a vehicle to extend his arm from the side of the vehicle, thus indicating to any one following that he desires to turn the vehicle in the direction indicated.

The object of the invention is to avoid the necessity of taking one hand off the wheel and also the inconvenience of projecting the arm, while turning a corner, and to provide apparatus that will indicate the direction in which the occupant of the vehicle wishes to turn, to the occupant of a vehicle following or/and approaching.

A further object is to indicate in a similar manner the desire of the occupant of a vehicle to stop, so that any one following or/and approaching will be warned of the immediate intention of the driver of the said vehicle.

Referring to the accompanying drawings,

Figure 1 is a front elevation of the complete apparatus.

Figure 2 is a part elevation of Figure 1, as it would appear if seen from the opposite side, with the top housing member removed so as to show the interior more clearly.

Figure 3 is a part plan view of Figure 1, and shows the relative position of the lamps for illuminating the signal arm, one lamp being omitted.

Figure 4 is a plan view of the switch which constitutes the main member of the oscillating signal arm control gear.

Figure 5 is a sectional view through line A—B in Figure 4.

Figures 6, 7 and 8 are elevations of the other various members necessary to complete the control gear.

Figure 9 is a plan view of Figure 8.

Figure 10 is a plan view of Figure 6.

Figure 11 is a section through C—D, Figure 10.

Figure 12 is a bottom plan view of Figure 6.

Figure 13 is the wiring diagram for the lighting circuit of the apparatus.

There is a sheathing 1 of comparatively light gauge, which is made from an oblong shaped piece of metal bent along its major axis to form a section resembling the letter U, and of suitable length and width to house two signal arms 2 and 3 when their service is not required. Two supporting straps 4 of fairly light gauge, one on either side of the housing 1, are secured thereto by suitable retaining means, either riveted or screwed, the end 5 of each plate being flush with the edge 6 of the U-shaped housing member 1. The said straps are bent at 7 to conform with the outer periphery of a tubular housing member 8, and are then secured together by a rivet 9 near the opposite end. Two holes 10 and 11 are for the purpose of attaching the complete apparatus to a bracket on any suitable part of the vehicle.

Another strap 12, shown in broken lines in Figure 2, is of heavier material, and has a hole 13 drilled vertically therein, of suitable diameter to fit the top end of the vertical hollow tubular member 8; the said strap 12 is riveted to the U-shaped housing member 1. At the bottom extremity of the tubular member 8 is a bracket 14, its boss like portion being made fast to the tubular member 8, and the flange portion to the housing 1 by means of the rivets 15.

The oscillating signal arms 2 and 3 are pivoted at 16, and are of any convenient length, having literal indications printed thereon to intimate the driver's intention to turn or stop; the said arms 2 and 3 have the said indications on either side of each plate, so that they will be seen by the driver of a following or/and approaching vehicle.

Each oscillating signal arm is constantly under the influence of the springs 17, both of which tend to keep the signal arms 2 and 3 in a vertical position in the housing 1 with the slightly tapered ends uppermost.

A link 18, pivoted at 19 near the extremity of the signal arm 3, Figure 2, has an overlapping portion 20 thereon at the top edge so that the said link 18 is at right angles to the said oscillating signal arm 3 when it is vertical. The connecting member 21 is pivoted at 22, and a flexible wire 23 is secured thereto and passes through a flexible armour 24 to the control gear. The other signal arm 2 is identical to that of arm 3, but is shown in Figure 2 in a set position. There is a top housing member 25, which may comprise an aluminium casting or pressed sheet metal, made secure to the housing 1 by means of screws 26. Two brackets 27, one on each side of the housing 1, are cast integral with the housing 25, and provide the means of supporting two lamp housings 28 situated one on each side of the apparatus to completely illuminate the oscillating arms 2 and 3 when turned into the set position.

The housing 28 may be of the same metal, and may be fashioned as illustrated at 29 in Figure 3, so that the oscillating arms 2 and 3 will be illuminated throughout their entire length. A small red glass disc 30 in each of the housings 28 is adapted to show a red light rearward from one lamp, while a red light is shown forwardly by the other.

The usual bayonet or screw type of electric lamp sockets is used, and a portion of the adapter is indicated at 31; flexible conductors 32 from the said sockets pass into the interior of the housing 25 at 33. The conductors 34 and 35 are connected directly to the accumulator 36 or battery of the car. The switch or control gear comprises a metal base plate 37; the two flexible Bowden wire controls 23 passing through two slots 38 and 39 into a hollow or recess 40, where they terminate. A boss like portion 41 of the base plate 37 has a cylindrical recess 42, which houses a spring 43 and portion of a releasing button 44. A threaded portion of the button 44 extends downwards, and screws into a suitably threaded hole in a locking pin 45. A piece of ebonite or some such suitable insulation 46 is secured by screws to the base plate 37, and a terminal and contact point 47 is secured therein, in such a manner that it will be completely insulated from the metal plate 37, and a conductor 48 goes to one side of each lamp in the circuit.

A thin spring brass strip 49 is made fast to the base plate 37 by the screws 50, and has sufficient resiliency to keep it in electrical contact with the contact point 47 so long as the button and locking pin are both in their released position, as indicated in Figure 5.

A grooved semi-circular member 51 has a hole 52 of suitable diameter to fit neatly over the boss like portion 41, and a groove 53 is fashioned in the periphery of the semi-circular member 51, so that when the member 51 is placed into the recess 40, the groove 53 will provide a race for the flexible Bowden wire controls 23. The stops 54 on the control wires 23 are adapted to fit in the V portions 55 of the groove 53 to prevent the said control wire from slipping.

The cap piece 56 is now placed over the assembled base plate member 37 and the semi-circular grooved member 51, and secured to member 37 by screws. The control handle 57 has a boss 58, which is adapted to fit in a hole 59' in the cap 56. There is a hole in the boss 58 to fit the boss 59 on the semi-circular grooved member 51, and a screw retains the handle portion 57 and grooved portion 51 in position. A suitable recess 60 in the bottom of the grooved member 51 is for the engagement of the locking pin 45, when the operator turns the control handle to the "stop" or "turn" position. Thus it will be seen that when it is desired to use the apparatus, the slot 60 will be radially opposite the locking pin 45, due to the tension of the spring 17, and partly to the weight of the oscillating signal arm; at the same time the locking pin will press down on the spring brass strip 49, and break the contact at the point 47.

When it is desired to bring one oscillating arm into operation, the driver turns the handle 57, and with it the grooved member 51, and turns, lifting the signal arm until such time as the locking pin 45 is directly under the slot 60 in member 51. When under the resistance of the helical spring 43, the said locking pin 45 engages with the slot 60 and at the same time allowing the spring brass strip to make contact with the contact point 47.

What I claim as new and desire to secure by Letters Patent is:—

A signal, a signal operator comprising a base plate having an aperture and having circuit controlling elements, a grooved semi-circular member mounted to turn on the said base plate and provided with a locking recess in its bottom surface, a flexible connection between said signal and the said member, a locking element seated in said aperture in the base plate having a projection to engage the locking recess of the member to lock the member in a predetermined position, the bottom of the member serving through contact with the locking element to hold the latter in inoperative locking relation in all other positions of the member, a push-button on said base member to disengage the locking element from said member, said locking element directly cooperating with one of the circuit controlling elements to move the latter to a position in which the circuit is open while the locking member is in engagement with the bottom surface of the grooved semi-circular member and to permit said circuit controlling element to move to circuit making position when the locking element is moved into the recess of the member, and means to turn the member to operate the signal.

In testimony whereof I have hereunto set my hand.

DOUGLAS McWILLIAM.